Jan. 28, 1936.  J. CARLSTROM  2,028,968
LINING FOR VESSELS
Filed Aug. 25, 1932  2 Sheets-Sheet 1

INVENTOR
John Carlstrom
BY
Donald H. Mace
ATTORNEY

Jan. 28, 1936.       J. CARLSTROM       2,028,968
LINING FOR VESSELS
Filed Aug. 25, 1932        2 Sheets-Sheet 2
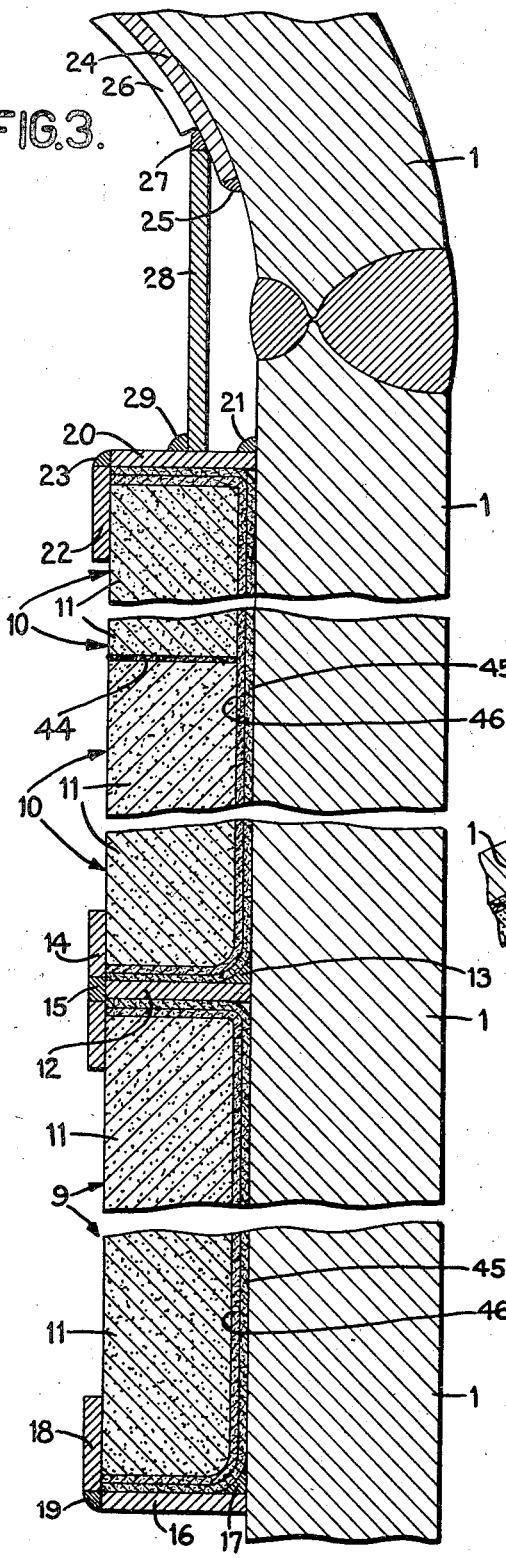
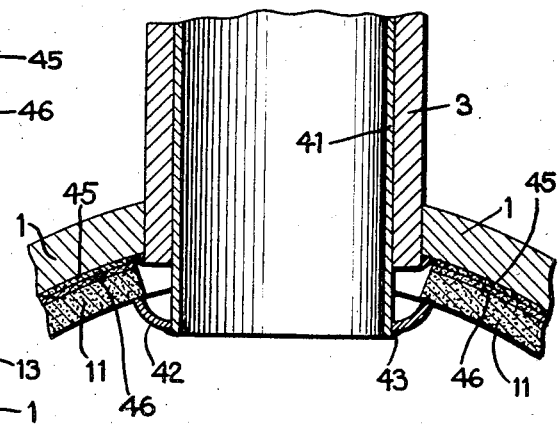
John Carlstrom
INVENTOR
BY Donald H. Mace
ATTORNEY Patented Jan. 28, 1936

2,028,968

UNITED STATES PATENT OFFICE 2,028,968

LINING FOR VESSELS

John Carlstrom, Port Arthur, Tex., assignor to The Texas Company, New York, N. Y., a corporation of Delaware Application August 25, 1932, Serial No. 630,408

3 Claims. (Cl. 196—133)

This invention relates to interior linings for the protection of vessels in which the treatment of materials corrosive to the walls thereof may be carried on, and refers particularly to the lining of ordinary steel vessels used in the pressure cracking of hydrocarbon oil.

In the pressure cracking of petroleum fractions corrosive compounds are encountered or are developed in the decomposition process which attack the steel walls of the vessels in which the treatment is being carried on, which has the effect of deteriorating or corroding away the metal very rapidly.

In practice the shells of vessels of this class are fabricated of much heavier material than is necessary merely to withstand the temperatures and pressures ordinarily employed, for the reason that in the course of operation the interior surfaces of the walls are deteriorated to an extent that their strength is materially impaired. Accordingly it has been necessary to allow for a certain amount of deterioration by making the walls of extra thickness. It will be seen that the expense of constructing large vessels is multiplied rapidly as the thickness of the shells is increased. It is therefore of advantage to provide an effective lining which is adapted to protect the interior surface of a vessel and which may be readily repaired or removed from and replaced in the vessel.

In instances where linings are bonded to the vessel and where the coefficient of expansion of the lining material is less than that of the vessel, the vessel has a tendency to expand away from it in which event the lining, not being strong enough to withstand the pressure usually employed, may rupture or may be expanded by the force of the pressure to the larger size and buckle when the temperature is next lowered to atmospheric. On the other hand where the coefficient of expansion of the lining is greater than that of the vessel it will have a tendency to bulge and buckle when the temperature is raised, in which event the lining may eventually rupture at the point of buckling.

Linings of this type may develop cracks therein, or the shell of the vessel may expand away from the lining so that a considerable space exists between the lining and the shell whereby corrosive vapors may be permitted to collect behind the lining in immediate contact with the wall of the vessel. Brick linings have certain insulating values and any vapors which might pass therethrough have the tendency to condense due to the somewhat lower temperature behind the lining. Where a substantially continuous lining is provided there is no immediate revaporization or escape of the resulting liquid and accordingly the walls of the vessel may be exposed to the corrosive action of the liquid and any additional increments thereof.

The invention contemplates a lining of corrosion resistant and insulating material which is intended to afford a tight seal between the walls of the vessel and the inclosed material being treated. In addition to the corrosion resisting and insulating material forming the lining proper, there are also provided sheets or layers of expansible material between the lining and the walls of the vessel to insure against leakage of the fluid or vapors being delivered to the metallic vessel walls. The invention also contemplates means for securing the protecting lining to the inner wall of the vessel which will permit the lining to expand or contract freely with changes in temperature independent of the wall of the vessel.

It is not necessary in all instances to line an entire vessel as frequently the portion occupied by the liquid is not subject to the severe corrosive conditions as is the portion occupied by the vapor. Accordingly the present description concerns specifically a partially lined vessel, although the entire vessel may be lined, if desired.

It is an object of the invention to provide a continuous lining of material which is corrosion resistant and which is also suitable for insulating the walls of the vessel against the high temperatures ordinarily maintained within the vessel. This is of particular advantage where the vessel has become worn to some extent and where dangerous stresses may be set up at the high temperatures and pressures employed.

Another object of the invention is to provide a corrosion resisting lining separated from the walls of the vessel with insulating material.

The invention will be more fully understood by referring to the following description and the accompanying drawings in which:

Fig. 2 is a view taken on the line 2—2 of Fig. 1.

Fig. 3 is an enlarged view in sectional elevation of the lining joints shown on the right hand side of Fig. 1.

Figure 1:
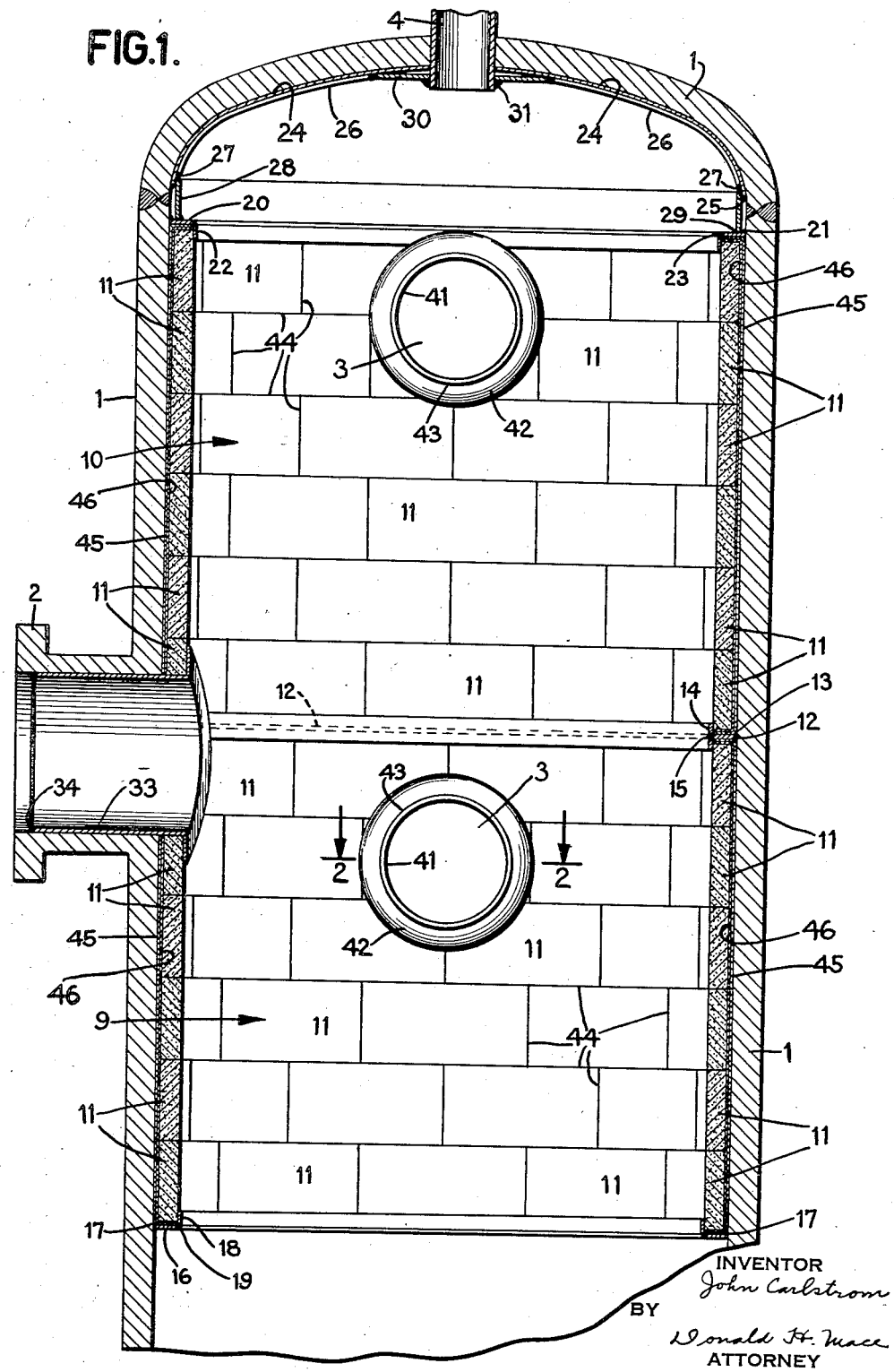
Fig. 1 is a view in sectional elevation of an interiorly lined vessel being a preferred embodiment of my invention.

Referring now to Fig. 1, an upper section of a vertical cylindrical vessel having a convex end or dome is illustrated which may be used in the pressure cracking of hydrocarbon oil. The apparatus shown is intended to be that portion of a vertical cracking chamber which is situated above a level of liquid carried in the vessel, which is usually referred to as the vapor space and in which the corrosive action of the existing vapors is especially pronounced. That portion of the vessel shown comprises a shell portion 1, a manway 2, pipe connections 3, a vapor outlet pipe 4 and the lining.

While I have shown a portion of a vertical cylindrical vessel having a convex end, it is to be clearly understood that my invention is not limited to a vessel shaped in this manner. The vessel may be of any shape and may be positioned in a horizontal or slanting position, if desired, without departing from the scope of my invention.

According to the invention the lining may include one or more sections 9, depending upon the vertical dimension of the shell portion to be lined, and a top section 10. Each section of the lining is made up of a plurality of corrosion resistant and insulating bricks 11. The bricks forming the lining may be of any convenient size and may be shaped to fit the curvature of the shell. Any suitable material may be used for the brick having the desired corrosion resisting and insulating qualities and which is adapted to stand up in service.

Referring to Fig. 3, a circular flat bar 12 which may be made up of arcuate sections of mild steel, is preferably welded to the shell 1, as at 13, to form a horizontal shelf for supporting the section 10. A circular flat bar 14 which also may be in several arcuate sections to form a circular member and having holes drilled at intervals along a middle line thereof for welding, may be welded to the inner edge of the bar 12, as at 15, in spaced relation to the shell 1 for slidably securing the lower edges of the bricks 11 of the upper section 10 adjacent thereto and the upper edges of the bricks 11 of the lower section 9 adjacent thereto.

A circular flat bar 16, similar to the bar 12, may be welded to the shell 1, as at 17, to form a horizontal shelf for supporting the bricks 11 forming the section 9 and a circular flat bar 18 may be welded to the inner edge of the bar 16, as at 19, in spaced relation to the shell 1 for slidably securing the lower edges of the bricks of section 9 adjacent thereto.

A circular flat bar 20 may be welded to the shell 1, as at 21, to form a horizontal shelf and a circular flat bar 22 may be welded to the inner edge of the bar 20 as at 23 in spaced relation to the shell 1 for slidably securing the upper edges of the bricks of section 10 adjacent thereto.

Metal or alloy metal plates 24 are provided for lining the convex end. These may be positioned so that the edges of the adjacent plates or segments form abutting joints. The dome plates are preferably supported at their lower or flaring ends by welding them to the shell, as at 25, and along their abutting joints by supporting bars 26. The bars 26 are preferably supported at their lower ends by welding, as at 27, to a sectional flat bar 28 which is preferably secured to the upper side of the flat bar 20 by welding, as at 29. At the top of the dome a disc-like plate 30 is preferably attached to the inwardly protruding vapor outlet pipe 4 by welding, as at 31. The plate 30 is adapted to overlap and support the upper or tapering ends of the dome plates 24 and also the bars 26, the upper ends of which abut and are welded to the peripheral edge of the disc 30.

A lining is provided for the manway 2 comprising a thimble or sleeve 33 which may be secured therein by welding the outer end to the neck of the manway as at 34 and by flaring the inner end against the wall lining.

The pipe connections 3, which in most cases are provided for communication to an adjoining vessel, may preferably be lined from one vessel through to the other. As shown in Fig. 2 the lining consists of a sleeve 41 of such length as to project slightly past the inwardly protruding end of the connection 3. A disc-like member 42, whose surface is compressed to form a circular concavity between the end of the pipe lining and the vessel lining, is welded at its inner edge to the end of the pipe lining, as at 43, and its peripheral edge presses against the vessel lining thus serving to protect the end of the pipe connection where it is welded to the wall of the vessel.

As shown in Fig. 3 the individual bricks 11 may be bonded together, as at 44, using any suitable bonding material, however, they are preferably not bonded to the shell but are secured thereto in the manner above described so that the lining may expand or contract freely with changes in temperature independent of the wall of the vessel.

Whether the co-efficient of expansion of the lining material is greater or less than that of the material of which the vessel is made cracks may develop in the lining with the result that the corrosive vapors may come in contact with the exposed walls of the vessel or the shell may expand away from the lining leaving a gap therebetween. Accordingly, the invention contemplates further protecting the shell of the vessel against contact with the corrosive substances by bonding thereto in any suitable manner a sheet 45 of asbestos or other suitable expansible material which may be stretched so as to fully protect the shell notwithstanding any expansion or contraction thereof due to temperature change. As a still further protection the invention contemplates bonding in any suitable manner a second sheet 46 of the material to the brick lining to prevent corrosive vapors passing through any cracks therein. As shown in Figure 1, the ends of each sheet are folded over and rest between the supporting bars and the ends of the bricks adjacent thereto. Additional sheets may be used as desired and these may be applied loosely between the first mentioned sheets or bonded to the one or the other so as to maintain a free or slidable joint between the shell of the vessel and the lining. It will be seen that by providing an increasing number of separate layers of the asbestos material for a given total thickness the possibility of cracks developing all the way through the several layers may be reduced to a minimum.

It is intended that the bars 14, 18 and 22 should overlap the joints between the lining and the supporting bars 12, 16 and 20 so as to complete the lining at these points while allowing for any unequal expansion or contraction as between the lining and the wall of the vessel.

It will be seen that a lining has been provided by this invention which is not attached to the shell at any point and which may expand and contract freely with changes in the temperature of the vessel shell. The lining provided may have any of the bricks removed from and replaced in the vessel as the conditions may require. Moreover, if desirable, the lining may be extended throughout the entire vessel.

From the foregoing, it will be seen that my novel type of lining may be applied to either new or old vessels. If the lining is used in conjunction with a new vessel, it will be unnecessary to make the vessel of extra thickness merely for the purpose of taking care of subsequent corrosion. Moreover, if a vessel has been used for a period of time sufficient to corrode the interior thereof to such an extent that any extended future use would make it unsafe in view of further corrosion, my corrosion resisting lining may be installed and the vessel operated safely.

The various metal parts of the lining exposed to the action of the corrosive substances present or evolved in the fluid being treated may be made from any suitable metal or metal alloy resistant to corrosion. In this manner, the entire lining will resist corrosion and the metal parts will not have to be replaced when the lining itself is otherwise satisfactory.

Obviously many modifications and variations of the invention, as hereinbefore set forth, may be made without departing from the spirit and scope thereof, and therefore, only such limitations should be imposed as are indicated in the appended claims.

I claim:

1. A vessel adapted to contain hydrocarbon oil undergoing treatment at high temperature comprising an outer metal shell forming an enclosed chamber, a layer of corrosion-resistant material secured to the interior wall of said shell and covering a portion thereof, a sheet of heat insulating material covering said layer and coextensive therewith, bricks secured to said sheet and means secured to said metal shell for supporting said sheet and bricks and permitting said shell to expand independently thereof.

2. A vessel adapted to contain hydrocarbon oil undergoing treatment at high temperature which comprises an outer metal shell forming an enclosed chamber, a layer of corrosion-resistant heat insulating material secured to the inner wall of said shell and covering a selected portion thereof, a sheet of heat insulating material covering said layer and coextensive therewith, bricks secured to said sheet and means secured to said outer shell for supporting said sheet and permitting independent expansion of said shell and layer.

3. A vessel adapted to contain hydrocarbon oils at relatively high temperature and pressure comprising an outer metal shell forming a closed chamber, a layer of heat insulating material secured to the interior wall of said shell and capable of expanding and contracting with said shell under the influence of heat, a second layer of heat insulating material covering said first layer and coextensive therewith, means independent of said first layer for supporting said second layer in position and permitting said first layer to expand with said shell independently of said second layer and a plurality of heat insulating bricks secured to said second layer and forming an interior lining for said shell.

JOHN CARLSTROM.